US011111257B2

(12) United States Patent
Klankermayer et al.

(10) Patent No.: US 11,111,257 B2
(45) Date of Patent: Sep. 7, 2021

(54) MOLECULAR CATALYSTS FOR SELECTIVE HYDROGENOLYSIS OF AMIDES (71) Applicant: Eastman Chemical Company, Kingsport, TN (US)

(72) Inventors: Jürgen Klankermayer, Essen (DE); Stefan Westhues, Aachen (DE); Walter Leitner, Aachen (DE); Robert Thomas Hembre, Johnson City, TN (US)

(73) Assignee: Eastman Chemical Company, Kingsport, TN (US)

( * ) Notice: Subject to any disclaimer, the term of this patent is extended or adjusted under 35 U.S.C. 154(b) by 186 days.

(21) Appl. No.: 16/409,522

(22) Filed: May 10, 2019

(65) Prior Publication Data
US 2019/0345178 A1 Nov. 14, 2019

Related U.S. Application Data (60) Provisional application No. 62/671,162, filed on May 14, 2018.

(51) Int. Cl.
C07F 9/50 (2006.01)
C07F 15/00 (2006.01)
B01J 31/22 (2006.01)
B01J 31/24 (2006.01)

(52) U.S. Cl.
CPC ......... *C07F 9/5022* (2013.01); *B01J 31/2409* (2013.01); *C07F 9/5072* (2013.01); *C07F 15/0046* (2013.01); *B01J 2231/643* (2013.01); *B01J 2531/0244* (2013.01); *B01J 2531/821* (2013.01)

(58) Field of Classification Search
CPC .. C07F 9/5022; C07F 9/5072; C07F 15/0046; B01J 2231/641
See application file for complete search history.

(56) References Cited

U.S. PATENT DOCUMENTS

| | | |
|---|---|---|
| 2012/0046481 A1 | 2/2012 | Barnicki et al. |
| 2012/0046500 A1 | 2/2012 | Barnicki et al. |
| 2015/0087867 A1 | 3/2015 | Klankermayer et al. |
| 2016/0168043 A1 | 6/2016 | Klankermayer et al. |
| 2018/0008972 A1 | 1/2018 | Klankermayer et al. |

FOREIGN PATENT DOCUMENTS

WO 2016/128044 A1 8/2016

OTHER PUBLICATIONS

Copending U.S. Appl. No. 16/455,968, filed Jun. 28, 2019.
Int'l Search Report and Written Opinion issued in Int'l Application No. PCT/US2019/039726 filed Jun. 28, 2019.
R.A. Findeis et al., "Tridentate phosphine ligands with novel linker-units," Dalton Trans., 2003, 249-254.
C. Bianchini et al., "Preparation, Characterization, and Performance of the Supported Hydrogen-Bonded Ruthenium Catalyst [(sulphos)Ru(NCMe)3]OSO2CF3)/SiO2," Organometallics 2000, 19, 2433-2444.
J. Buchele et al., "Chemistry in interphases. The solid-phase synthesis of well defined rhodium and iridium phosphine complexes," Chem. Comm., 1999, 2165-2166.
S. Westhues et al., "Ruthenium-Catalyzed Modular Synthesis of Cyclic Tertiary Amines from Lactams," Angew. Chem. Int. Ed. 2016, 55, 12841-12844.
C. Bianchini et al., "Synthesis of the first polymer-supported tripodal trisphosphine ligand and its application in the heterogeneous hydrogenolysis of benzo[b]thiophene by rhodium catalysis," Chem. Comm., 2001, 479-480.
P. Schober et al., "Functionalized Ether Derivatives of HOCH2C(CH2PPh2)3 and Related Tripod Ligands—Synthesis and Coordination Chemistry," Eur. J. Inorg. Chem. 1998, 1407-1415.
B. Kesanli et al., "Mesoporous silica anchored Ru catalysts for highly enantioselective hydrogenation of B-ketoesters," Chem. Comm., 2004, 2284-2285.
R.A. Findeis et al., "Tripodal Phosphane Ligands with Novel Linker Units and Their Rhodium Complexes as Building Blocks for Dendrimer Catalysts," Eur. J. Inorg. Chem. 2003, 99-110.
T. Seitz et al., "Electrophilic Activation of OH Groups in Organophosphorus Compounds—An Application of Phosphane Boranes," Z. Naturforsch, 49b, 1813-1817 (1994).
T. Seitz et al., "Functionalized tripod-Ligands with Neopentane Framework: Reaction of H)CH2C(CH2PR2)3 with Electrophiles," Z. Naturforsch, 50b, 1287-1306 (1995).
R. Kadyrov, "Hydrogenolysis of Amide Acetals and Iminium Esters," ChemCatChem 2018, 10, 170-172.

(Continued)

*Primary Examiner* — Caixia Lu
(74) *Attorney, Agent, or Firm* — Phan Law Group PLLC (57) ABSTRACT

A compound by the name 1,1,1-tris(di(3,5-dimethoxyphenyl)phosphino-methyl)ethane. The compound can be represented by the structure of formula (I):

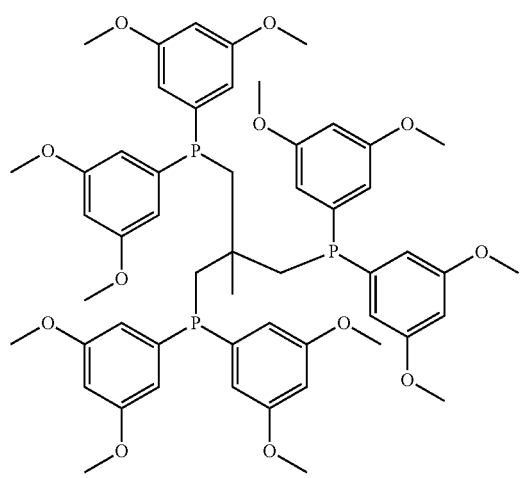

The compound is useful as a ligand for ruthenium to form an organometallic complex. The complex is an active catalyst for the hydrogenolysis of amides to form amines and optionally alcohols.

20 Claims, 2 Drawing Sheets

(56) References Cited

OTHER PUBLICATIONS

M. Meuresch et al., "Tailor-Made Ruthenium-Triphos Catalysts for the Selective Homogeneous Hydrogenation of Lactams," Angew. Chem. Int. Ed., 2016, 55, 1392-1395.

Anon., "Catalytic Hydrogenation of Amides," Aug. 2, 2014 (Sat) Ozawa Jun (D1), pp. 1-20.

Int'l Search Report and Written Opinion issued in Int'l Application No. PCT/US2019/031856 filed May 10, 2019.

S. Wesselbaum et al., "Hydrogenation of carbon dioxide to methanol using homogeneous ruthenium-Triphos catalyst: from mechanistic investigations to multiphase catalysis," Chem. Sci., 2015, 6, 693-704.

MOLECULAR CATALYSTS FOR SELECTIVE HYDROGENOLYSIS OF AMIDES

CROSS-REFERENCE TO RELATED APPLICATION

This is application claims the benefit of Provisional Application No. 62/671,162 filed on May 14, 2018 under 35 U.S.C. § 119(e)(1); the entire content of the provisional application is hereby incorporated by reference.

FIELD OF THE INVENTION

The invention generally relates to the field of organic chemistry. It particularly relates organic ligands, organometallic complexes containing the ligands, methods of making, and methods of using the ligands and complexes.

BACKGROUND OF THE INVENTION

Reducing amides is an important reaction in organic synthesis. However, traditional processes suffer from various disadvantages, such as generating large amounts of waste/by-products and/or requiring harsh conditions.

Thus, there is a need in the art to provide alternative and/or improved processes for hydrogenolysing amides to form amines and optionally alcohols.

The present invention addresses this need as well as others, which will become apparent from the following description and the appended claims.

SUMMARY OF THE INVENTION

The invention is as set forth in the appended claims.

Briefly, in one aspect, the invention provides a compound having the structural formula (I):

(I)

In another aspect, the invention provides an organometallic compound having the structural formula (II):

(II)

wherein Ar represents a 3,5-dimethoxyphenyl group and L represents a leaving group.

In yet another aspect, the invention provides a process for hydrogenolysing an amide. The process comprises the step of:

contacting an amide with hydrogen in the presence of an organometallic catalyst comprising a central metal and a tridentate ligand at conditions effective to form an amine and optionally an alcohol,
wherein the central metal comprises ruthenium, and
wherein the tridentate ligand has the structural formula (I).

DETAILED DESCRIPTION OF THE INVENTION

It has been surprisingly found that a coordination complex comprising ruthenium as the central metal and a ligand represented by the structural formula (I):

(I)

is particularly effective as a catalyst for the hydrogenolysis of amides to form amines and optionally alcohols.

Thus, in one aspect, the invention is directed to a compound of the formula (I).

The compound of the formula (I) may be named as "1,1,1-tris(di(3,5-dimethoxyphenyl)phosphinomethyl)ethane." It may also be referred to herein as "triphos-(OMe)$_2$" or "triphos(OMe)$_2$."

Triphos-(OMe)$_2$ may be prepared by contacting bis(3,5-dimethoxyphenyl)phosphine with tris(bromomethyl)ethane in a compatible solvent in the presence of a base. The solvent is not particularly limiting so long as it can sufficiently dissolve the reactants and the base. Suitable solvents include polar aprotic solvents, such as dimethyl sulfoxide (DMSO). The base is also not particularly limiting. Suitable bases include alkali metal alkoxides, such as potassium-tert-butoxide. The reaction may be carried out at room temperature.

In another aspect, the invention is directed to an organometallic compound having the structural formula (II):

wherein
Ar represents a 3,5-dimethoxyphenyl group, and
L represents a leaving group.

The leaving group L represents one or more "volatile" or easily removable ligands, which stabilizes the complex so that it may be handled before the hydrogenolysis reaction, but during the reaction sequence, it is generally replaced by the reactant(s). Examples of such volatile ligands include trimethylenemethane, allyl, methylallyl, ethylene, cyclooctadiene, acetylacetonate, and acetate.

In various embodiments, the leaving group L comprises trimethylenemethane. In which case, the organometallic compound has the structural formula (IIa):

wherein Ar represents a 3,5-dimethoxyphenyl group.

The compound of the formula (IIa) may be referred to herein as "[Ru(triphos-(OMe)$_2$)TMM]" or "[Ru(triphos(OMe)$_2$)TMM]."

The compound of the formula (II) may be prepared by reacting triphos-(OMe)$_2$ with a Ru-containing compound.

The Ru-containing compound is not particularly limiting. It can be a salt or a complex containing ruthenium, independent of its formal oxidation state. Suitable Ru-containing compounds include Ru(acac)$_3$, [Ru(COD)(methylallyl)$_2$], Ru(NBD)(methylallyl)$_2$, Ru(ethylene)$_2$(methylallyl)$_2$, [(COD)RuCl$_2$]$_n$, RuCl$_3$, [(PPh$_3$)$_3$Ru(H)(CO)Cl], and [(cymanthren)RuCl$_2$]$_2$.

In various embodiments, the Ru-containing compound comprises [Ru(COD)(methylallyl)$_2$].

The reaction to form the compound of the formula (II) may be carried out at room temperature or at elevated temperatures, such as from 60 to 210° C., from 100 to 200° C., or from 120 to 180° C.

As noted, the complex comprising ruthenium and triphos-(OMe)$_2$ is particularly effective as a catalyst for the hydrogenolysis of amides to form amines and optionally alcohols.

Thus, in another aspect, the present invention provides a process for hydrogenolysing an amide. The process comprises:

contacting an amide with hydrogen in the presence of an organometallic catalyst comprising a central metal and a tridentate ligand at conditions effective to form an amine and optionally an alcohol, wherein the central metal comprises ruthenium, and
wherein the tridentate ligand has the structural formula (I) herein.

It should be noted that not necessarily all of the phosphines are bound to the ruthenium during the reaction. Moreover, not all of the phosphorus atoms may catalytically be involved in the reaction.

The amount of the organometallic catalyst used for carrying out the reaction can vary over a wide range. For example, the catalyst concentration may range from 0.01 to 10 mol %, based on the initial amount of the amide.

The hydrogenolysis process may be carried out in the absence of an added acid.

Alternatively, the hydrogenolysis process may be carried out in the presence of an acid.

Thus, in yet another aspect, the invention provides a catalyst composition comprising the compound having the structural formulas (II) or (IIa), and an acid.

In the case one or more acids are used in the hydrogenolysis reaction, the (initial) concentration of acid may be 0.5 to 20 times the concentration of ruthenium on a molar basis. Other acid concentrations include 0.8 to 10 times, 1 to 5 times, or 1 to 2 times the concentration of ruthenium on a molar basis.

The acid is not particularly limiting. For example, it may be organic or inorganic, such as sulfonic acids, especially methanesulfonic acid, trifluoromethanesulfonic acid, p-toluenesulfonic acid, and sulfuric acid; trifluoroacetic acid; perchloric acid; and mixtures thereof. Other suitable acids include those that provide weak coordinating anions after deprotonation, such as bis(trifluoromethane)sulfonimide (HNTf$_2$) or mixtures thereof with the aforementioned acids.

In various embodiments, the acid may be HNTf$_2$, methanesulfonic acid (MSA), tris(pentafluorophenyl)borane (B(C$_6$F$_5$)$_3$), or aluminum trifluoromethanesulfonate (Al(OTf)$_3$).

The temperature for carrying out the hydrogenolysis contacting step may vary over a wide range. For example, it may be carried out at room temperature up to, e.g., 250° C. Other contacting step temperatures include from 60 to 210° C., from 120 to 200° C., and from 140 to 180° C.

Depending on the amide to be reacted, the process may be performed in the absence of or in the presence of an added solvent. The solvent may be common non-polar solvents, such as aliphatic or aromatic hydrocarbons, or slightly polar, aprotic solvents, such as ethers. Examples of aliphatic solvents include pentanes and hexanes. Examples of aromatic solvents include benzene, xylenes, toluene, and trimethylbenzenes. Examples of ethers include tetrahydrofuran, dioxane, diethyl ether, and polyethers.

The contacting step may be carried out at an initial hydrogen pressure of at least 1 bar, at least 10 bar, or at least 20 bar and in each case, up to 1000 bar, up to 750 bar, up to 500 bar, up to 250 bar, or up to 100 bar.

There is no particular restriction on the type of amide that can be converted in the hydrogenolysis process of the present invention. For example, the amide may be primary, secondary, or tertiary, although primary amides may be less selectively reduced than secondary or tertiary amides. In various embodiments, the amide is secondary or tertiary.

Specific examples of amides that can be used in the process of the invention include N-methylacetamide, N,N-dimethylacetamide, N-methylprionamide, N,N-dimethylpropionamide, N-methylisobutyramide, N,N-dimethylisobutyramide, n-methylbutyramide, N,N-dimethylbutyramide, N-methyl valeramide, N,N-dimethylvaleramide, N-methylcaproamide, N,N-dimethylcaproamide, N-methylbenzamide, N,N-dimethylbenzamide, N-methylphenacetamide, N,N-dimethylphenacetamide, 2-ethyl-N-methylhexanamide, 2-ethyl-N,N-dimethylhexanamide, N-methyldecanamide, N,N-dimethyldecanamide, N-hexylcaproamide, N-acetylpyrrolidine, N-acetylpiperidine, N-acetylmorpholine, N-benzyl-2-methoxyacetamide, N-methylglycolamide, N,N-dimethylglycolamide, N-hexyl-2-methoxyacetamide, N-hexyl-3-methyloxetane-3-carboxamide, N-hexyl-2-furanylcarboxamide, N-benzylbenzamide, N-ethylacetamide, N-methylpropionamide, N-cyclohexyl-2-methoxyacetamide, N-phenylacetamide, N-phenylhexylamide, 2-methoxy-N-phenylacetamide, N-phenylbenzamide, ethylenediamine-N,N'-(2-methoxyacetamide), N-hexanoylmorpholine, N-butanoylmorpholine, N-2-methoxyacetylpyrrolidine, N-formylmorpholine, N,N-dimethylformamide, N,N-dimethylbenzamide, tetramethyloxamide, N,N,N',N'-tetramethyl-1,4-cyclohexanedicarboxamide, and N,N'-dimethyl-1,4-cyclohexanedicarboxamide.

The process of the invention can also hydrogenolyse cyclic amides, such as χ-butyrolactam, δ-valerolactam, ε-caprolactam, piperizin-2-one, cyclodiglycine, cycloglycyl-L-valine, N-methylpyrrolidinone, N-phenylpyrrolidinone, N-ethyl-pyrolidinone, N-butylpyrolidinone, N-methylpiperidinone, N-methyl-5-methylpiperidinone, N-methylcaprolactam, and N-ethylcaprolactam.

In various embodiments, the amide is δ-valerolactam, N-hexylhexanamide, N-methyldecylamide, or N-dimethyldecylamide.

To remove any doubt, the present invention includes and expressly contemplates and discloses any and all combinations of embodiments, features, characteristics, parameters, and/or ranges mentioned herein. That is, the subject matter of the present invention may be defined by any combination of embodiments, features, characteristics, parameters, and/or ranges mentioned herein.

It is contemplated that any ingredient, component, or step that is not specifically named or identified as part of the present invention may be explicitly excluded.

Any process/method, apparatus, compound, composition, embodiment, or component of the present invention may be modified by the transitional terms "comprising," "consisting essentially of," or "consisting of," or variations of those terms.

As used herein, the indefinite articles "a" and "an" mean one or more, unless the context clearly suggests otherwise. Similarly, the singular form of nouns includes their plural form, and vice versa, unless the context clearly suggests otherwise.

While attempts have been made to be precise, the numerical values and ranges described herein should be considered as approximations. These values and ranges may vary from their stated numbers depending upon the desired properties sought to be obtained by the present disclosure as well as the variations resulting from the standard deviation found in the measuring techniques. Moreover, the ranges described herein are intended and specifically contemplated to include all sub-ranges and values within the stated ranges. For example, a range of 50 to 100 is intended to include all values within the range including sub-ranges such as 60 to 90, 70 to 80, etc.

Any two numbers of the same property or parameter reported in the working examples may define a range. Those numbers may be rounded off to the nearest thousandth, hundredth, tenth, whole number, ten, hundred, or thousand to define the range.

The content of all documents cited herein, including patents as well as non-patent literature, is hereby incorporated by reference in their entirety. To the extent that any incorporated subject matter contradicts with any disclosure herein, the disclosure herein shall take precedence over the incorporated content.

This invention can be further illustrated by the following working examples, although it should be understood that these examples are included merely for purposes of illustration and are not intended to limit the scope of the invention.

EXAMPLES

Example 1

Synthesis of Bis(3,5-dimethoxyphenyl)phosphinoxide

Magnesia turnings (3.2 g, 0.138 mmol, 1.2 eq.) were weighed into a 500 mL three-neck round bottom flask. 2-MTHF (2-methyltetrahydrofuran) (100 mL) was added, and a little amount of I2 was added to the stirring suspension. 1-bromo-3,5-dimethoxybenzene (25 g, 0.115 mmol, 1 eq.) was diluted in 2-MTHF (60 mL) before it was added via a dropping funnel to the vigorous stirring reaction suspension. When the Grignard reaction started (exothermic reaction and color change of the reaction suspension from colorless to yellowish), the reaction flask was placed in a 70° C. pre-heated oil bath. The 1-bromo-3,5-dimethoxybenzene solution was added over a 3-hour period. After the addition was completed, the resulting orange solution was cooled down to 0° C. with an ice bath, and diethylphosphite (5.24 g, 0.038 mmol, 0.33 eq.) diluted in 2-MTHF (60 mL) was added through the dropping funnel over a 2-hour period. The reaction solution was allowed to warm up over night before it was quenched with half concentrated aqueous HCl solution (50 mL). The organic layer was washed with H$_2$O (2×50 mL) and a saturated brine solution (50 mL). The resulting yellowish gel was suspended in a mixture of Et$_2$O and M$^t$BE, and the product was obtained as a white powder.

Yield: 5.6 g, 50%, 98% purity via $^1$H, $^{13}$C and $^{31}$P-NMR-spectroscopy.

Example 2

Synthesis of Bis(3,5-dimethoxyphenyl)phosphine

Bis(3,5-dimethoxyphenyl)phosphinoxide (5.6 g, 0.017 mmol, 1 eq.) was dissolved in a mixture of 2-MTHF (40 mL) and THF (20 mL) in a 100 mL Schlenk tube. A solution of DIBAL-H (3.6 g, 0.025 mmol, 1.5 eq.) in 2-MTHF (20 mL) was added dropwise to a vigorous stirring reaction solution. (Careful evolution of H$_2$). Once the addition was completed, the reaction was allowed to stir at room temperature for 2 hours. Afterwards, the reaction was quenched with aqueous 1 M NaOH solution (4 mL) and H$_2$O (20 mL). Since the quenched reaction solution turned into a gel with no phase separation, acetic acid (5 mL) was added to the gel. After 5 minutes of stirring, the reaction solution was allowed to settle. Subsequently, the organic phase was separated, and the solvent was removed in vacuo. The product was purified via distillation at 190° C. in high vacuo (0.001 mbar) and obtained as a colorless oil, which crystallized to a colorless solid overnight.

Yield: 2.7 g, 49%, 98% purity via $^1$H, $^{13}$C and $^{31}$P-NMR-spectroscopy.

Example 3

Synthesis of Triphos-(OMe)$_2$

Bis(3,5-dimethoxyphenyl)phosphine (1 g, 3.26 mmol, 3.2 eq.) and potassium-tert-butoxide (386.8 mg, 3.45 mmol, 3.4 eq.) were dissolved in DMSO (8 mL) in a 100 mL Schlenk tube. The clear reddish solution was allowed to stir for 1 hour at room temperature before a solution of 1,1,1-tris (bromomethyl)ethane (314 mg, 1.02 mmol, 1 eq.) in DMSO (3 mL) was added dropwise. The reaction was stirred for 16 hours at room temperature. Subsequently, the reaction was quenched with H$_2$O (40 mL). The white solid gel was separated, and the milky aqueous solution was extracted with M$^t$BE (3×20 mL). The white gel and the organic phase were combined and dried in high vacuo. The resulting gel was purified in boiling EtOH (20 mL) and obtained as a colorless gel.

Yield: 778 mg, 78%, with >99% purity via $^1$H, $^{13}$C and $^{31}$P-NMR-spectroscopy.

Example 4

Synthesis of [Ru(Triphos-(OMe)$_2$)TMM]

Triphos-(OMe)$_2$ (440 mg, 0.477 mmol, 1 eq.) and [Ru (COD)(methylallyl)$_2$] (142.7 mg, 0.477 mmol, 1 eq.) were weighed into a 45 mL Schlenk tube and dissolved in mesitylene (10 mL). The reaction was stirred at 130° C. for 16 h, thereby the product precipitated from the reddish reaction solution. The precipitate was separated, washed with pentane (2×10 mL), and dissolved in DCM (dichloromethane) (3 mL). The clear yellow solution was dried in vacuo at 80° C. The product was obtained as yellow powder.

Yield: 306 mg, 60%, with 98% purity via $^1$H, $^{13}$C and $^{31}$P-NMR-spectroscopy.

Example 5

Hydrogenolysis of Methyl Benzoate

Methyl benzoate was subjected to hydrogenolysis under the same reaction conditions (0.5 mol % [Cat.], 16 h reaction time, 140° C., 2 mL 1,4-dioxane, 100 bar H$_2$) using three different catalysts, each with and without an acid, to form benzyl alcohol and methanol. The catalysts were [Ru(triphos-xyl)TMM], [Ru(triphos-(CF$_3$)$_2$)TMM], and [Ru(triphos-(OMe)$_2$)TMM]. The acid was HNTf$_2$.

Figure 1:
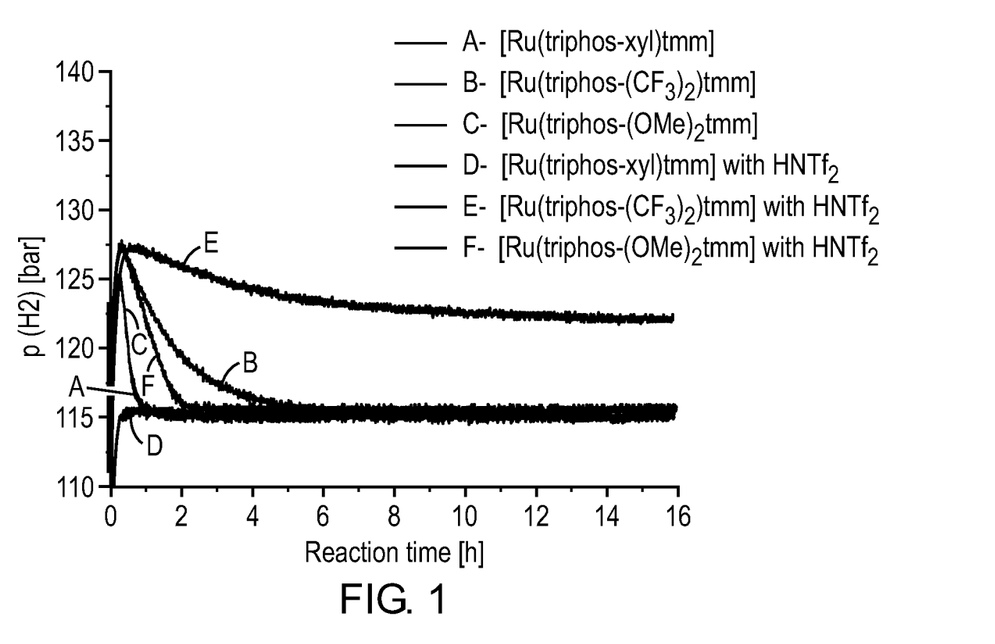
FIG. 1 is a graph of the hydrogen pressure versus reaction time of the hydrogenolysis of methyl benzoate using various Ru catalysts with and without acid from Example 5.

The results are shown in FIG. 1.

As seen from FIG. 1, the catalyst of the present invention [Ru(triphos-(OMe)$_2$)TMM] yielded full conversion with and without an acidic additive.

In the absence of HNTf$_2$, [Ru(triphos-(OMe)$_2$)TMM] was as fast as [Ru(triphos-xyl)TMM].

In the presence of HNTf$_2$, [Ru(triphos-(OMe)$_2$)TMM] was slower than [Ru(triphos-xyl)TMM].

Example 6

Hydrogenolysis of δ-Valerolactam

δ-Valerolactam was subjected to hydrogenolysis under the same reaction conditions (0.5 mol % [Cat.], 16 h reaction time, 160° C., 2 mL THF, 100 bar H$_2$) using three different catalysts, each with and without an acid, to form piperidine. The catalysts were [Ru(triphos-xyl)TMM], [Ru(triphos-(CF$_3$)$_2$)TMM], and [Ru(triphos-(OMe)$_2$)TMM]. The acid was methanesulfonic acid.

Figure 2:
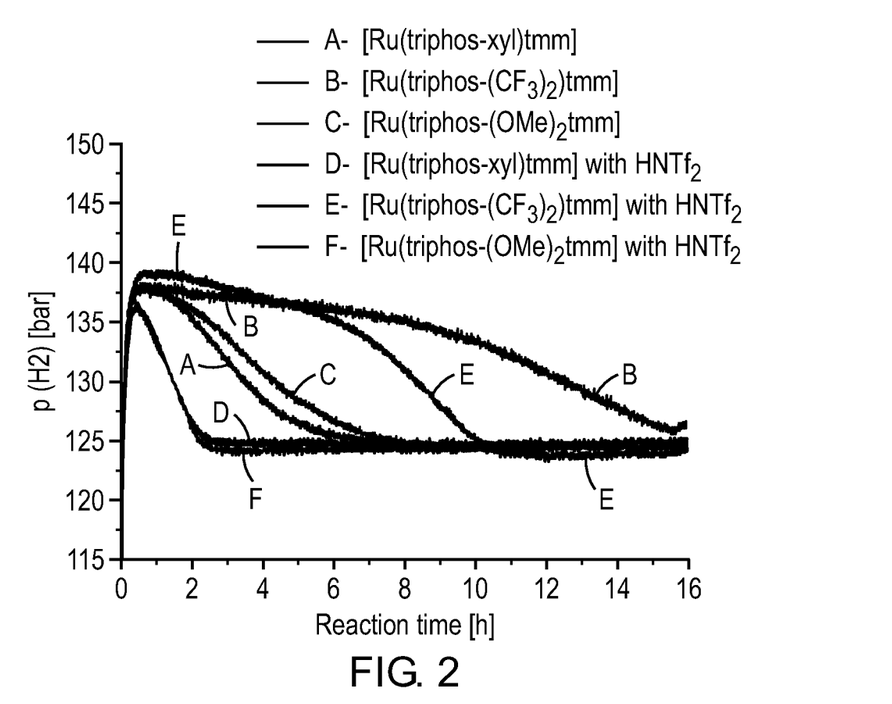
FIG. 2 is a graph of the hydrogen pressure versus reaction time of the hydrogenolysis of δ-valerolactam using various Ru catalysts with and without acid from Example 6.

The results are shown in FIG. 2.

As seen from FIG. 2, the catalyst of the present invention [Ru(triphos-(OMe)$_2$)TMM] yielded full conversion in the presence and absence of methanesulfonic acid. This reaction velocity is comparable with that of [Ru(triphos-xyl)TMM].

An additional observation can be made by comparing the data in FIG. 1 with those in FIG. 2. FIG. 1 shows that the hydrogenolysis rate of methyl benzoate to benzyl alcohol catalyzed by a triphos derivative with methyl groups in the 3- and 5-positions of the aromatic groups was essentially identical to the hydrogenolysis rate catalyzed by a triphos derivative with methoxy groups in the 3- and 5-positions (in the absence of an acid co-catalyst). However, when a strong-noncoordinating acid, such as triflamic acid (HNTf$_2$), was added to the reaction mixture, the hydrogenolysis occurred much faster with the dimethyl-substituted catalyst than the 3,5-dimethoxy-substituted catalyst. In contrast, with respect to the cyclic amide substrate δ-valerolactone (FIG. 2), while the hydrogenolysis rates by the 3,5-dimethyl and the 3,5-dimethoxy triphos derivative catalysts were similar in the absence of an acid co-catalyst, both were accelerated by the presence of the methane sulfonic acid (MSA) to a very similar extent. Thus, the 3,5-dimethoxyphenyl triphos derivative, with an acid co-catalyst, is an excellent catalyst for amide hydrogenolysis.

Example 7

Hydrogenolysis of N-Hexylhexanamide

N-Hexylhexanamide was subjected to hydrogenolysis under the same reaction conditions (0.5 mmol [substrate], 10 μmol [Cat.], 10 μmol [acid], 16 h reaction time, 160° C., 2 mL THF, 100 bar H$_2$) using two different catalysts, each with two different acids. The catalysts, acids, and results are reported in Table 1.

TABLE 1

| Cat. (2 mol %) | Acid (2 mol %) | Hexyl-amine (%) | Hexanol (%) | Dihexyl-amine (%) | Trihexyl-amine (%) | Conv. (%) |
|---|---|---|---|---|---|---|
| [Ru(triphos-xyl)TMM] | $B(C_6F_5)_3$ | 7.6 | 5.4 | 26.03 | 2.1 | 34.6 |
| [Ru(triphos-(OMe)$_2$)TMM] | $B(C_6F_5)_3$ | — | — | 84.00 | 16.00 | 99.0 |
| [Ru(triphos-xyl)TMM] | $Al(OTf)_3$ | 5.4 | 13.1 | 19.04 | 1.4 | 37.2 |
| [Ru(triphos-(OMe)$_2$)TMM] | $Al(OTf)_3$ | 4.3 | 12.5 | 25.2 | 5.6 | 35.1 |

Example 8

Hydrogenolysis of N-Methyldecylamide

The hydrogenolysis of N-methyldecylamine works best with a 1:2 molar ratio of [Ru(triphos-xyl(OMe)$_2$)TMM] and Al(OTf)$_3$. Thus, when N-methyldecylamine (1.0 mmol) was reacted at 160° C. under an atmosphere of H$_2$ (100 bar) with [Ru(triphos-(OMe)$_2$)TMM] (10 μmol) and 2 mol % Al(OTf)$_3$, a conversion of 96% of the amide was observed. The reaction produced 16% decanol, 52% methyldecylamine, and 32% of methyldidecylamine.

Example 9

Hydrogenolysis of N-Dimethyldecylamide

The hydrogenolysis of N,N-dimethyldecylamine works best with a 1:2 molar ratio of [Ru(triphos-(OMe)$_2$)TMM] and B(C$_6$F$_5$)$_3$. Thus, when N,N-dimethyldecylamine (1.0 mmol) was reacted at 160° C. under an atmosphere of H$_2$ (100 bar) with [Ru(triphos-(OMe)$_2$)TMM] (10 μmol) and 2 mol % B(C$_6$F$_5$)$_3$, a conversion of 99% of the amide was observed. The reaction produced 3% decanol and 97% dimethyldecylamine.

The invention has been described in detail with particular reference to specific embodiments thereof, but it will be understood that variations and modifications can be made within the spirit and scope of the invention.

We claim:

1. A compound having the structural formula (I):

2. A method of making the compound of claim 1, the method comprising contacting bis(3,5-dimethoxyphenyl)phosphine with 1,1,1-tris(bromomethyl)ethane in the presence of a base.

3. An organometallic compound having the structural formula (II):

wherein
Ar represents a 3,5-dimethoxyphenyl group, and
L represents a ligand selected from trimethylenemethane, allyl, methylallyl, ethylene, cyclooctadiene, acetylacetonate, and acetate.

4. The compound according to claim 3, wherein L comprises trimethylenemethane.

5. A method of preparing the organometallic compound of claim 3, the method comprising contacting a Ru-containing compound with a compound having the structural formula (I):

(I)

6. The method of claim 5, wherein the Ru-containing compound is selected from Ru(acac)$_3$, [Ru(COD)(methylallyl)$_2$], Ru(NBD)(methylallyl)$_2$, Ru(ethylene)$_2$(methylallyl)$_2$, [(COD)RuCl$_2$]$_n$, RuCl$_3$, [(PPh$_3$)$_3$Ru(H)(CO)Cl], or [(cymanthren)RuCl$_2$]$_2$.

7. The method of claim 6, wherein the Ru-containing compound comprises [Ru(COD)(methylallyl)$_2$].

8. A catalyst composition comprising the organometallic compound of claim 3, and an acid.

9. A catalyst composition comprising the organometallic compound of claim 4, and an acid.

10. The catalyst composition of claim 8, wherein the acid is selected from HNTf$_2$, methanesulfonic acid, B(C$_6$F$_5$)$_3$, or Al(OTf)$_3$.

11. The catalyst composition of claim 9, wherein the acid is selected from HNTf$_2$, methanesulfonic acid, B(C$_6$F$_5$)$_3$, or Al(OTf)$_3$.

12. A process for hydrogenolysing an amide, the process comprising:
contacting an amide with hydrogen in the presence of an organometallic catalyst comprising a central metal and a tridentate ligand at conditions effective to form an amine and optionally an alcohol,
wherein the central metal comprises ruthenium, and
wherein the tridentate ligand has the structural formula (I):

(I)

13. The process of claim 12, which is carried out in the absence of an added acid.

14. The process of claim 12, which is carried out in the presence of an acid.

15. The process of claim 14, wherein the acid is selected from HNTf$_2$, methane sulfonic acid, B(C$_6$F$_5$)$_3$, and Al(OTf)$_3$.

16. The process of claim 12, wherein the catalyst comprises a compound having the structural formula (IIa):

(IIa)

wherein Ar represents a 3,5-dimethoxyphenyl group.

17. The process of claim 13, wherein the catalyst comprises a compound having the structural formula (IIa):

(IIa)

wherein Ar represents a 3,5-dimethoxyphenyl group.

18. The process of claim 14, wherein the catalyst comprises a compound having the structural formula (IIa):

(IIa)

wherein Ar represents a 3,5-dimethoxyphenyl group.

19. The process of claim 15, wherein the catalyst comprises a compound having the structural formula (IIa):

(IIa)

wherein Ar represents a 3,5-dimethoxyphenyl group.

20. The process of claim 12, wherein the amide comprises δ-valerolactam, N-hexylhexanamide, N-methyldecylamide, or N-dimethyldecylamide.

* * * * *